March 27, 1934. A. ARUTUNOFF 1,952,191
SUBMERGIBLE ELECTRIC CABLE AND METHOD FOR MAKING SAME
Filed Dec. 1, 1930
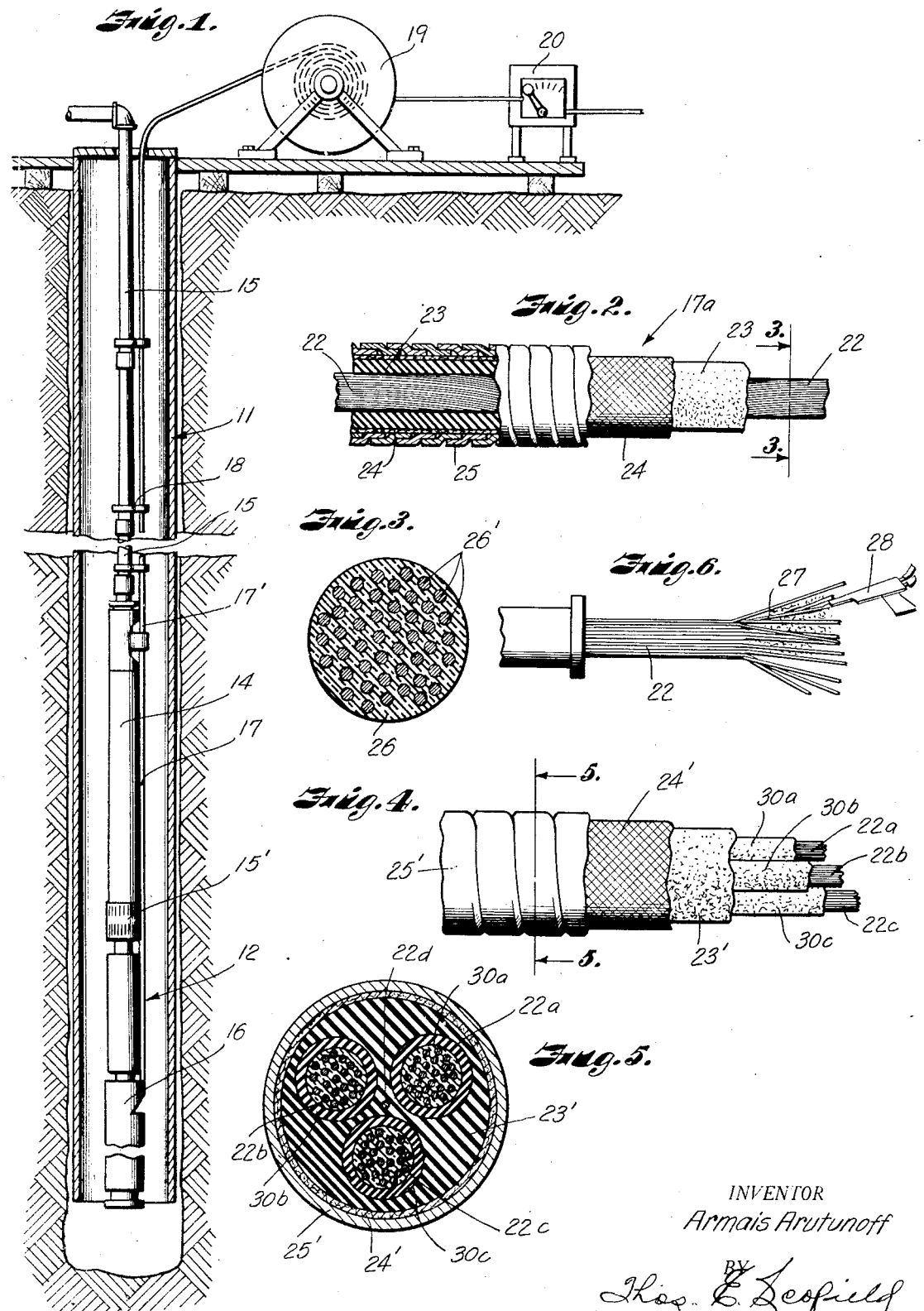
INVENTOR
Armais Arutunoff
BY
Thos. E. Leofield
ATTORNEY Patented Mar. 27, 1934

1,952,191

UNITED STATES PATENT OFFICE 1,952,191

SUBMERGIBLE ELECTRIC CABLE AND METHOD FOR MAKING SAME

Armais Arutunoff, Tulsa, Okla.

Application December 1, 1930, Serial No. 499,205

4 Claims. (Cl. 173—267)

This invention has to do with improvements in the construction of electric cables and is more particularly related to cables of this nature which are especially adapted for use in connection with submergible electric pumps such as are shown and described in my Patents Nos. 1,610,726 and 1,701,468.

This invention is a continuation in part of my application Serial No. 403,343, filed October 29, 1929.

The cable contemplated by this invention has been developed primarily for use in connection with submergible motors and pumps such as have been recently developed in connection with the petroleum industry.

The general construction of submergible pumps of the type referred to above comprises a pump which is associated with an electric motor. The entire unit is constructed in a manner such that the motor and the pump may be positioned within the well. The pump unit is supported by means of a fluid delivery tubing and current is delivered to the motor through a flexible cable which must be light in weight and in which the insulation must withstand the action of the liquid in the well.

In the development of the conductor contemplated by this invention, an attempt was made to use an ordinary rubber covered cable, but it was found that the oil encountered in the well soon attacked the rubber, causing the insulation to break down and rendering the cable useless. It was also found that in the event a small break occurred in the insulation of the ordinary cable embodying a stranded conductor, the conductor would absorb considerable water. In other words, the water would tend to fill the pores between the strands of wire comprising the conductor, seeping into the cable a considerable distance on either side of the break in the insulation. It was impossible, therefore, in a cable of this nature to simply repair the break in the insulation and thereby remedy the trouble. An attempt was also made to use a cable which was provided with lead insulation, but aside from the question of expense, the lead insulation proved very unsatisfactory in view of its weight and low tensile strength, and also in view of the fact that the lead cable could not be satisfactorily subjected to the repeated winding and unwinding onto and from the reel.

It was found, therefore, in the development of the cable contemplated by this invention, that a cable adapted for use in connection with submergible electrical devices of this nature must satisfy four requirements. The cable must be flexible; it must be light in weight; it must be provided with insulation which will withstand the action of hot oil. etc.; and the conductor itself must be constructed so as to prevent the seeping action referred to above. In addition to this, the cable should be provided with some type of armor which will protect the insulation from mechanical injuries.

The primary object of this invention is to produce an electric cable which will satisfy the above requirements. To accomplish this object, I use a stranded conductor in which the pores or voids between the strands are filled with a flexible insulating material such as rubber, lacquer or varnish This insulating material prevents the seepage of liquid into the stranded conductor in the event it becomes exposed. The cable is embedded in a casing of flexible insulation such as rubber, and the rubber is in turn encased in a specially treated webbing, the webbing being treated to withstand the action of the medium in which the cable is to be used.

It is also an object of this invention to produce a method for making the standed conductor itself. So far as I am aware, a stranded conductor in which the pores or voids between the strands are filled with insulating material is new, particularly where the rubber is molded with the strands to form a unitary structure as contrasted with the well-known practice of sheathing the strands with an insulated covering, and the method for its production is novel.

The details in the construction of preferred embodiments of my invention, together with other objects attending its production will be best understood from the following description of the accompanying drawing which is chosen for illustrative purposes only and in which:

Fig. 1 is a sectional elevation of an oil well with a submergible electric pump of the type referred to above suspended therein.

Fig. 2 is an elevation partly in section and partly broken away showing a preferred form of cable contemplated by this invention.

Fig. 3 is a sectional elevation of the stranded conductor which may be considered as having been taken in a plane represented by the line 3—3 in Fig. 2.

Fig. 4 is an elevational view with parts broken away, showing another form of my invention.

Fig. 5 is a sectional elevation which may be considered as having been taken in a plane represented on the line 5—5 of Fig. 4.

Fig. 6 is a view showing one manner of forming the insulated stranded cable.

More particularly describing the invention as herein illustrated, reference numeral 11 indicates a well in which a pump unit 12 is suspended at the lower end of a delivery tubing 15. The pump unit 12 comprises a pump 14 which is associated with a strainer chamber 15' and is adapted to be operated by an electric motor 16. The electric motor 16 is energized through the medium of a cable 17 which is clamped to the tubing as indicated at 18 and extends over a reel 19 to a control switch 20.

In the operation of this device it will be understood that as the pump 12 is lowered into the hole, the cable 17 is unwound from the reel 19. It is necessary, of course, to remove the pump from the well from time to time for the purpose of repacking, etc., in which event the conductor 17 must be wound upon the reel 19 and again unwound therefrom when the pump unit is replaced. It will be apparent, therefore, that the cable 17 must be flexible and constructed so as to withstand the wear incurred during these repeated winding and unwinding operations. The details in the construction of the cable contemplated by this invention are best illustrated in Figs. 2 to 5 inclusive.

Referring now to Figs. 2 and 3, the cable 17$^a$ is shown as comprising a stranded conductor 22, which is imbedded in flexible insulating material such as rubber, indicated by reference numeral 23. The three conductors designated as 22$^a$, 22$^b$ and 22$^c$, comprising a plurality of wire strands, may be cabled about a single core strand designated as 22$^d$, the core strand also being preferably insulated with rubber insulation or the like. The insulation 23 is covered by a web casing 24, and the web casing 24 is impregnated with varnish or a similar oil resistant material while it is being woven or after it has been woven about the insulation 23. The insulated cable so far described is shown as being encased by metal armor of the spiral type indicated by reference numeral 25.

It was mentioned above that for the purpose of preventing seepage in the conductor in the event it is exposed by a rupture occurring in the insulation of the cable, pores between the strands of the cable are filled with insulation material such as rubber, lacquer, varnish or the like. This is best illustrated in Fig. 3 where the insulating "filler" is indicated by reference numeral 26 and the individual strands of the conductor are indicated at 26'.

It will be understood that various processes may be used in the formation of a stranded cable of this nature. While the strand, when in process of manufacture, may be molded in a suitable insulating compound, I consider it preferable to spray the cable with the filling material while the same is being wound. This operation is indicated in Fig. 6 where the open end 27 of the cable 22 is shown as being sprayed by means of a spray gun 28.

In the event it is necessary that the conductor be used in connection with a three phase electric circuit, I propose to make the same in the manner illustrated in Figs. 4 and 5. In this form of my invention, the individual wires of the stranded conductors indicated by reference characters 22$^a$, 22$^b$, and 22$^c$, are first molded or imbedded in an insulating material such as rubber, lacquer or the like and are each encased within an insulation sleeve 30$^a$, 30$^b$, and 30$^c$ respectively. All three of the cables are then imbedded in a single insulation casing 23' which is similar to the casing 23 shown in Fig. 2. The insulation casing 23' is enclosed within an oil resistant webbing 24' which in turn is covered with the armor 25'.

It will be apparent from the foregoing description that the cable contemplated by this invention is of simple form and construction and may be easily and economically manufactured. It will also be apparent that the cable is flexible, is resistant to the action of hot oils or the like, and that the stranded conductor itself is so formed as to preclude the possibility of seepage in the event the insulation casing becomes ruptured.

It is to be understood that while I have herein described and illustrated certain preferred forms of my invention and described the same in connection with a power operated pumping unit, that the invention is not limited to the precise construction or the particular application set forth above, but includes within its scope whatever changes fairly come within the spirit of the appended claims.

I claim as my invention:

1. A power cable which comprises at least a pair of conductors twisted around one another and each formed of cabled strands in layers, the interstices in each conductor being filled with rubber, a rubber sheath around the conductors, a layer of insulating fabric over the rubber sheath, a continuous film of oil-proof lacquer over the fabric, and a sheath of armor over the film.

2. An article of manufacture comprising a plurality of electrically connected conducting strands cabled together to form a single electrical conductor in which the current passes in the same direction through all of the strands forming the conductor, the interstices within the conductor being filled with rubber, and a rubber sheath around the conductor.

3. An article of manufacture comprising a plurality of electrically connected conducting strands disposed in layers and forming a single electrical conductor in which the current passes in the same direction through all of the strands forming the conductor, the interstices between the strands being filled with rubber, and a rubber sheath around the conductor.

4. An article of manufacture comprising a plurality of electrically connected conducting strands cabled together to form a single electrical conductor in which the current passes in the same direction through all of the strands forming the conductor, the interstices in the conductor being filled with rubber, a rubber sheath around the conductor, a layer of insulated fabric over the sheath, a continuous film of oil-proof lacquer over the layer, and a sheath of armor over the film.

ARMAIS ARUTUNOFF.